(12) United States Patent
Merritt

(10) Patent No.: US 7,520,215 B1
(45) Date of Patent: Apr. 21, 2009

(54) ADJUSTABLE TAILGATE LATCH FOR ROUND BALER

(75) Inventor: John H. Merritt, New Holland, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/939,584

(22) Filed: Nov. 14, 2007

(51) Int. Cl.
*B30B 5/06* (2006.01)
*A01D 39/00* (2006.01)

(52) U.S. Cl. .................. 100/88; 56/341; 292/341.17; 292/341.18

(58) Field of Classification Search .......... 100/100, 100/87, 88, 89; 56/341; 292/117, 118, 119, 292/217, 341.15, 341.17, 341.18
See application file for complete search history.

(56) References Cited

U.S. PATENT DOCUMENTS

| | | | |
|---|---|---|---|
| 2,367,127 A | 1/1945 | Johansson | |
| 3,416,828 A * | 12/1968 | Russell et al. | 292/341.18 |
| 4,313,631 A | 2/1982 | Johnson | |
| 4,389,929 A * | 6/1983 | Kluver et al. | 100/88 |
| 4,389,930 A | 6/1983 | Rutschilling | |
| 4,407,190 A | 10/1983 | Cheatum | |
| 4,907,831 A | 3/1990 | Di Giusto | |
| 5,598,690 A | 2/1997 | McClure et al. | |
| 6,048,001 A | 4/2000 | Miller et al. | |
| 6,539,851 B1 | 4/2003 | Wilkens et al. | |
| 6,679,530 B2 | 1/2004 | Krynski | |
| 6,752,438 B2 | 6/2004 | DeSouza | |
| 6,783,163 B2 | 8/2004 | Sadler | |
| 6,843,170 B1 * | 1/2005 | Guthmann et al. | 100/35 |

* cited by examiner

*Primary Examiner*—Jimmy T Nguyen
(74) *Attorney, Agent, or Firm*—Patrick M. Sheldrake; John Williams Stader; Michael C. Harms

(57) ABSTRACT

An adjustable tailgate latching mechanism for a round bale utilizing a movable arcuate hook-like latch catching structure attached to the latching mechanism that enables proper alignment of the tailgate latch to be established and maintained.

3 Claims, 4 Drawing Sheets

ADJUSTABLE TAILGATE LATCH FOR ROUND BALER

BACKGROUND OF THE INVENTION

The present invention, relating generally to an agricultural baler for forming cylindrical bales of crop material, commonly referred to as a round baler, is directed to an improved tailgate latching apparatus. More particularly, this invention is concerned with an improvement to the latching apparatus that secures the tailgate of a round baler to the main frame during bale formation.

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler is pulled along the windrows to pick up the crop material and form it into conveniently sized and shaped round bales. More specifically, the windrow pickup of the baler gathers the cut and windrowed crop material and lifts it into the baling chamber. In a round baler, the baling chamber consists of a pair of opposing sidewalls with a series of belts that rotate and compress the crop material into a cylindrical shape. When the bale has achieved a desired size and density, the operator wraps the bale to ensure that the bale maintains its shape and density. The operator then raises the tailgate of the baler and ejects the bale onto the ground. The tailgate is then closed and the cycle repeated as necessary and desired to manage the field of cut crop material. The utilization of rolls in combination with belts is shown by way of example in the round baler of U.S. Pat. No. 4,870,812, by Richard E. Jennings, et al., which is incorporated in its entirety herein by reference.

It is common practice to use a latching assembly to maintain a round baler tailgate in the closed position during bale formation in the chamber. Prior art latching mechanisms experienced, under certain crop conditions excessive stress on the tailgate pivot pins when the hydraulic cylinder, employed to hold the latch in place during operation, exerts a force on the latch pin. This stress is applied as a rotational force on the tailgate pivot pins. Concurrently, a lateral force is incumbent on the tailgate during bale formation as the package of crop material expands within the chamber. Thus, the latch pin, which is being forced downwardly, transmits a downward force to the entire tailgate, which in turn produces the deleterious rotational force mentioned above, while at the same time a lateral force is being applied to the pivot pins, all of which could cause stress and ultimate fatigue if left uncorrected.

An improved latching mechanism designed to alleviate these stress conditions is shown in U.S. Pat. No. 5,598,690, by John R. McClure et al. which is incorporated in its entirety herein by reference. The baler has a latching assembly for holding the tailgate in the closed position, which assembly comprises a latch arm mounted on the main frame, a latch pin mounted on the tailgate in operative relationship with the latch arm, and means for coupling the lift means to the latch arm for moving the latch arm between latched and unlatched positions corresponding to the open and closed positions of the tailgate. The McClure invention also incorporated a unique means mounted on the main frame for engaging the latch arm to prevent the latch arm from exerting downward force on the tailgate via the latch pin to avoid any resulting transmittal of such downward force to the tailgate hinge shaft.

Due to extensive tolerance buildup in the manufacture of round balers, the relative position of elements of the latching mechanisms of the tailgate latches may vary significantly from one baler to the next and even from side to side on the same baler. The resulting misalignment may easily exceed the alignment variation capability of the known latching mechanisms and thereby prevent the tailgate from being securely latched in a closed position for baling, prevent the tailgate from opening to discharge a completed bale, or result in excessive stresses on tailgate components. Correcting the misalignment is typically performed by grinding portions of the latching mechanism to obtain the proper fit or re-mounting tailgate latch pins to correct the misalignment. Such actions require significant effort. Furthermore, if misalignment in the tailgate latching mechanism occurs as a result of wear in the baler, correcting the problem generally means that the baler must be removed from operation, a correction that is rarely convenient to perform.

It would be a great advantage to provide an easily adjustable tailgate latch for a round baler that overcomes the above-identified problems and disadvantages.

SUMMARY OF THE INVENTION

Accordingly, it is an object of the present invention to provide an adjustable tailgate latch for a round baler that avoids the above-noted disadvantages.

It is another object of the present invention to provide an adjustable latch mechanism for a round bale wrapping that maintains proper geometry of the mechanism to provide proper opening and closing of the tailgate.

It is a further object of the present invention to provide an adjustable latch for a round bale wherein each side may be independently adjusted.

It is a further object of the present invention to provide an adjustable latch for a round baler that is easily adjustable using simple hand tools.

It is a further object of the present invention to provide an adjustment mechanism on a tailgate latch for a round baler that utilizes, to the extent practical, existing latch mechanism members with minor modification.

It is a still further object of the present invention to provide an adjustable tailgate latch mechanism that will maintain proper alignment once set, but also allow subsequent re-alignment of the latching mechanism as necessary.

It is a still further object of the present invention to provide an adjustment mechanism for a round baler tailgate latch that is durable in construction, inexpensive of manufacture, carefree of maintenance, easily assembled, and simple and effective to use.

These and other objects are achieved by providing an adjustable tailgate latching mechanism for a round bale utilizing a movable latch pin catching structure attached to the latching mechanism that enables proper alignment of the tailgate latch to be established and maintained.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
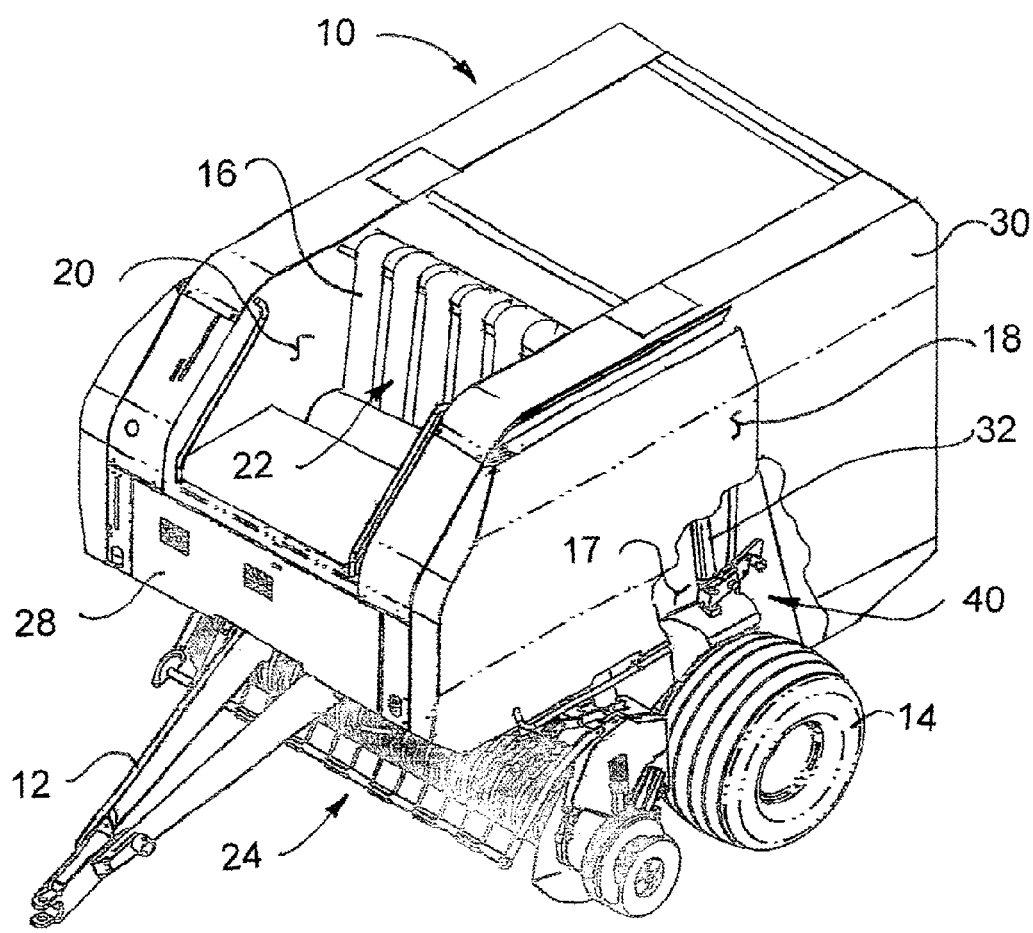
FIG. 1 is an isometric view of a round baler of the type on which the adjustable latching mechanism of the present invention is useful.
Figure 2:
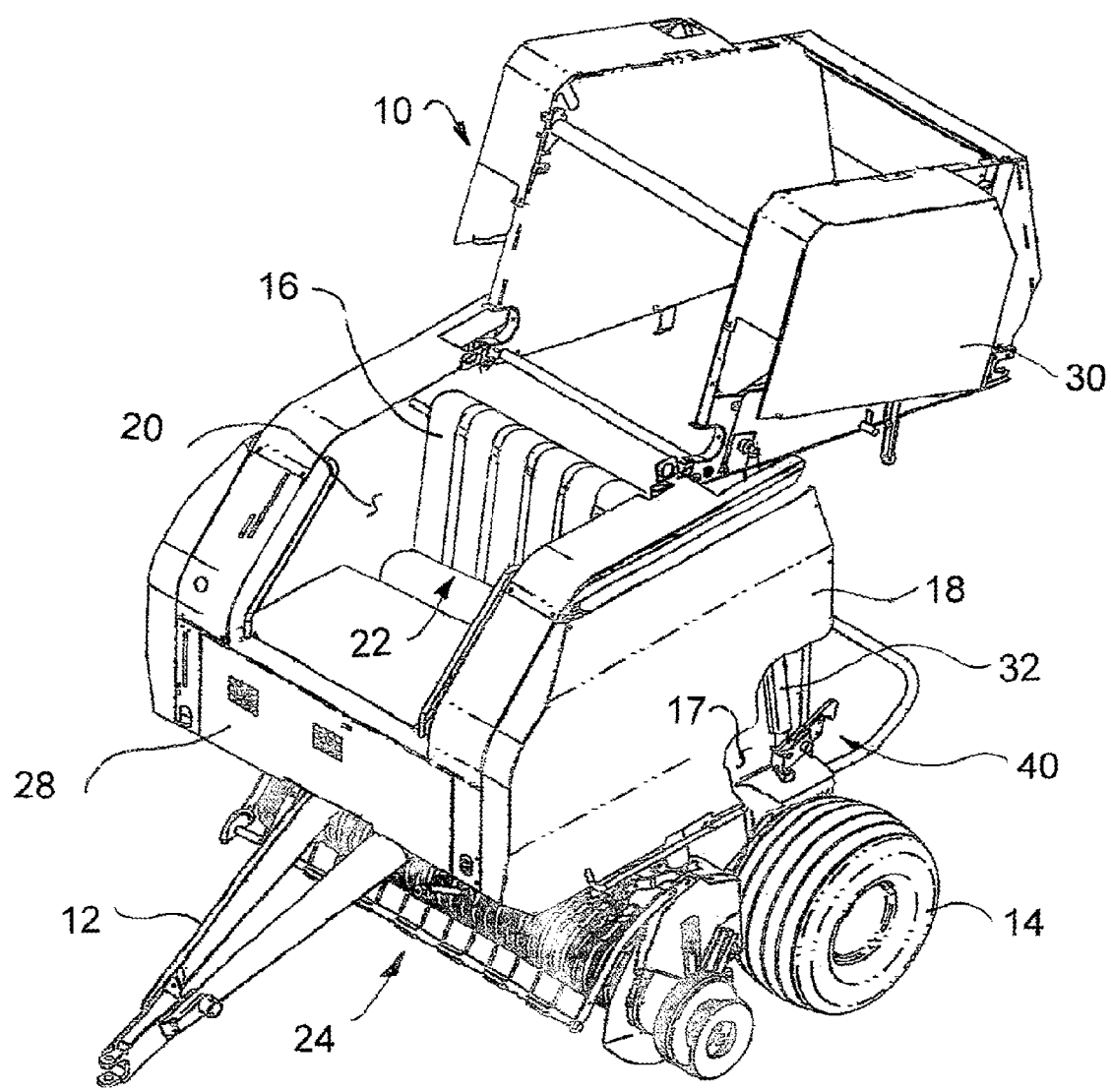
FIG. 2 is an isometric view of the round baler of FIG. 1 showing the tailgate in the open position.

Referring to FIGS. 1 and 2, a generally well-known round baler 10, with which the adjustable tailgate latch of the present invention can be used, is shown to comprise a main frame terminating forwardly in a tongue 12 and rearwardly slightly beyond a transverse axle to which a pair of wheels 14 (only one shown) are mounted, thus forming a wheel supported main frame (not shown in detail). The main frame supports a series of belts 16 and rolls (not shown) which together with a first sidewall 17 (shown in the breakout) behind and generally parallel to cover panel 18 and a second sidewall 20, all together establishing a bale-forming chamber 22. Cut crop material is picked up by transverse pickup 24 and fed into bale-forming chamber 22 where it is, as discussed above, formed into a cylindrically shaped bale. It is then wrapped with twine or a wrapping material dispensed from a wrapping mechanism generally behind shield 28. Upon completion of the wrapping process, latch 40 (only one side shown) is released, tailgate 30 is pivoted upwardly by operation of hydraulic cylinder 32 (only one side shown), and the bale is ejected onto the ground.

Figure 3:
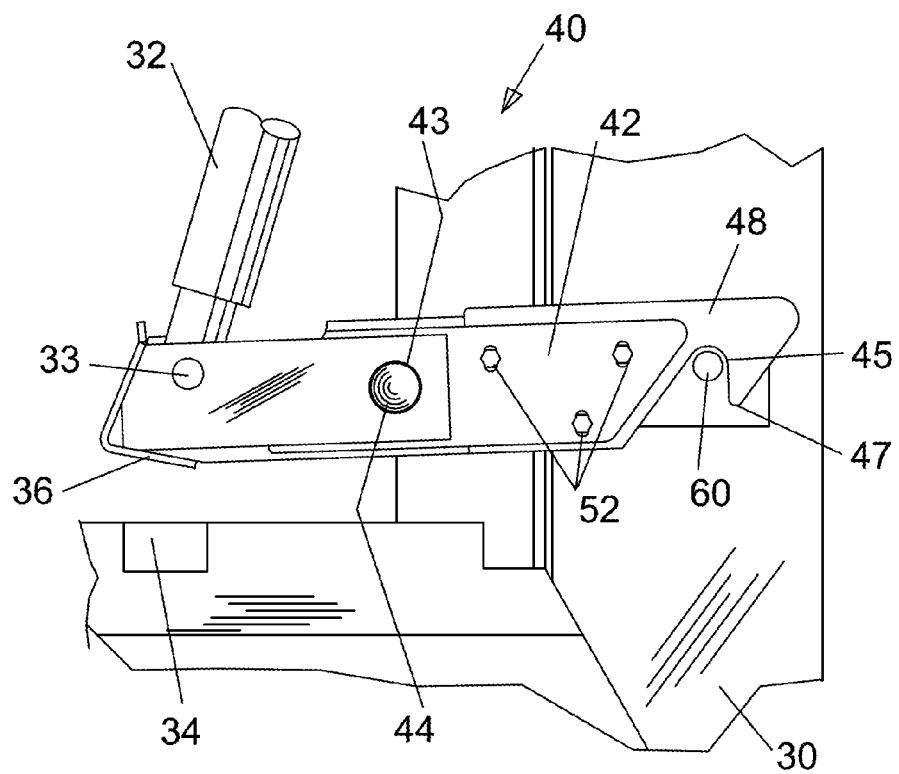
FIG. 3 is a partial side elevation view of a round baler tailgate latch showing the adjustable latch mechanism of the present invention in the latched position.
Figure 4:
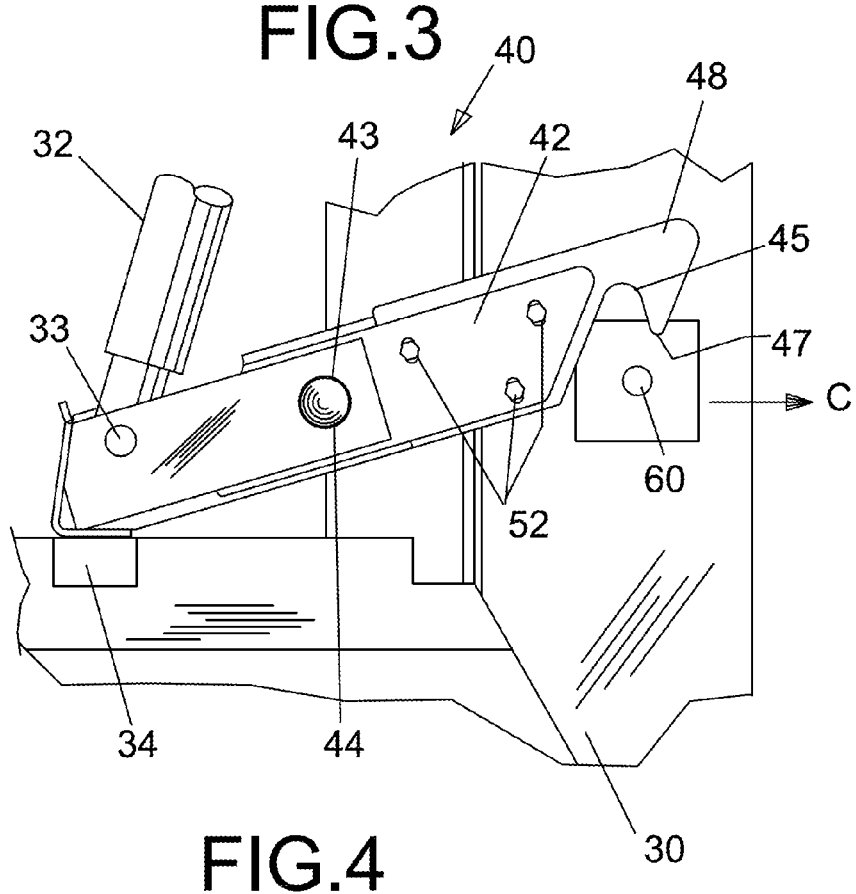
FIG. 4 is partial side elevation view of a round baler tailgate latch showing the adjustable latch mechanism of the present invention in the unlatched position.

FIGS. 3 and 4 provide a detailed view of the tailgate latch mechanism 40. A left side latch is shown; a mirror image latch is disposed on the right side of the baler to engage the right side of the tailgate. The latch mechanism 40 includes a lever arm 42 which is pivotally coupled to the round baler by pivot point 43 engaging a pivot pin 44 in a manner such that a portion of lever arm 42 extends in opposing directions from pivot point 43. One end of lever arm 42 is pivotally coupled to hydraulic actuator 32 using pin 33. The opposite end of lever arm 42 is connected to catch plate 48 which includes arcuate catch structure 45 featuring a hook-like structure for engaging latch pin 60 mounted on tailgate 30. As shown in FIG. 3, the latch mechanism 40 is in the latched position as it would be during the closed baling chamber condition when the baler is forming a bale. FIG. 4 shows the latch mechanism 40 in the unlatched position as it would be when the tailgate 30 is to be raised to discharge a bale.

Opening of tailgate 30 is initiated by extending hydraulic cylinder 32. The initial extension of cylinder 32 causes lever arm 42 to pivot slightly in the counter clockwise direction as shown, until lever arm end 36 contacts bumper 34 on the baler chassis. The pivotal motion of lever arm 42 causes catch plate 48 to be raised with respect to latch pin 60 until the catch structure 45 no longer engages or restrains the latch pin 60. Once lever arm end 36 is in contact with bumper 34 (shown in FIG. 4), further extension of cylinder 32 raises tailgate 30 until the fully open position (shown in FIG. 2) is reached. From a fully open (raised) tailgate position, closing the tailgate 30 involves retracting hydraulic cylinder 32 until the tailgate 30 returns to the closed position (shown in FIG. 1). Once hydraulic cylinder 32 is no longer supporting the weight of the open tailgate, further retraction of cylinder 32 causes lever arm 42 to pivot slightly, this time in the clockwise direction until catch structure 45 engages and retains latch pin 60.

Problems occur when mis-positioning of latch pin 60 occurs, whether by production tolerance, wear in the tailgate pivot mechanism, or minor damage. If the position of latch pin 60 is higher with respect to pivot pin 44, then pivoting of the lever arm 42 may not be sufficient for the catch structure 45 to allow the latch pin 60 to pass by tip 47 and allow the tailgate to open. If the latch pin 60 is low with respect to pivot pin 44, catch structure 45 may not engage latch pin 60 when the hydraulic cylinder is fully retracted thereby leaving the tailgate unlatched. Furthermore, misalignments may occur on only one side of the tailgate, so a non-releasing or non-engaging catch will result in twisting of the tailgate during attempted opening or closing operations which may cause further misalignment of the tailgate latch.

Figure 5:
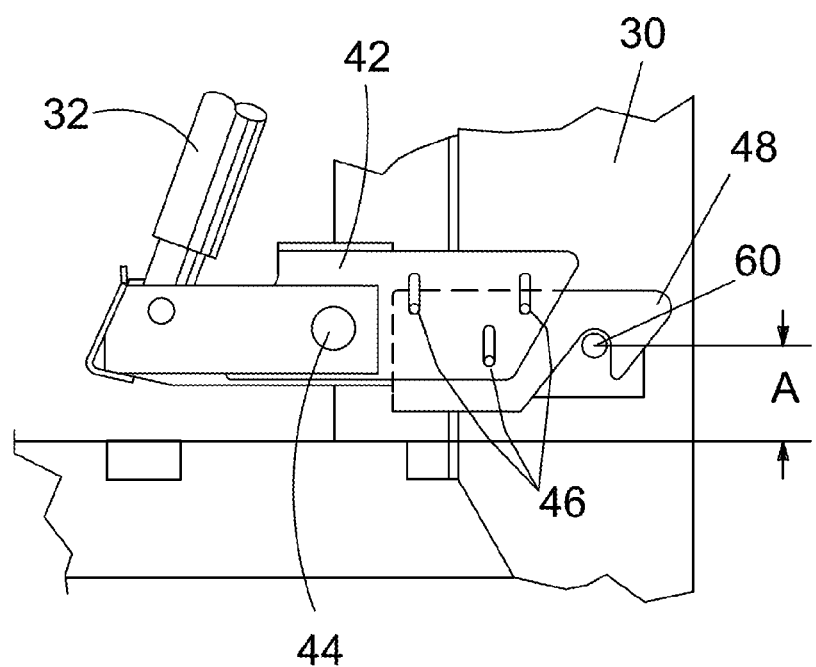
FIG. 5 is a partial side elevation view of the adjustable latch mechanism shown in a first position in the adjustment range.
Figure 6:
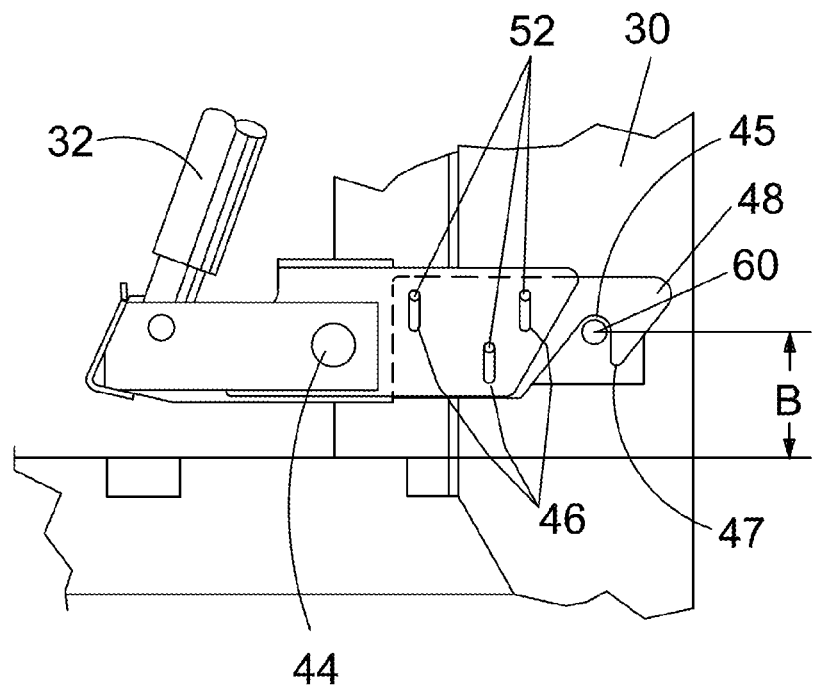
FIG. 6 is a partial side elevation view of the adjustable latch mechanism shown in a second position in the adjustment range.

Referring now to FIGS. 5 and 6, the adjustment features of the present invention are shown The catch plate 48 is slideably connected to lever arm 42 by slotted openings 46 and fasteners 52. The alignment of slotted openings 46 allows catch plate 48 to be moved generally perpendicular to the longitudinal axis of lever arm 42 which, as installed on the baler, allows the catch plate 48 to be vertically adjusted with respect to the pivot pin 44. The range of adjustment of catch plate 48 allows catch structure 45 to be vertically moved to optimally align with latch pin 60 so that latch pin 60 is restrained when the latch 40 is in the latched position (shown in FIG. 1) and that latch pin 60 is not restrained, when the latch 40 is in the unlatched position (shown in FIG. 2). In the unlatched position, latch pin 60 is able to move in the direction indicated as C in FIG. 4 corresponding to opening of the tailgate as tip 47 is positioned away from (above) the path of latch pin 60.

The contour of the arcuate portion of catch structure 45 is such that it closely matches the contour of a portion of the periphery of the latch pin 60, typically a round rod-like structure, so that when the latch 40 is engaged, movement of the latch pin 60 is prevented as it is in contact with catch structure 45. By moving catch plate 48 in relation to the lever arm 42 and hence in relation to both the pivot pin 44 and the latch pin 60, the interface between the catch structure 45 and the latch pin 60 can be precisely aligned for optimal interface. Additionally, clearance of the latch pin 60 and tip 47 must also be considered with the latch 40 in the unlatched position. Again, adjustment of the catch plate 48 may be required to allow the latch pin 60 to move rearwardly (direction C in FIG. 4) without contacting the catch plate 48. Adjustment of the catch plate 48 enables an optimal balance between these two conditions to be obtained without requiring permanent modification, such as cutting or grinding, of the catch structure 45.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In an agricultural round baler having a forward end, an opposing rear end and opposing first and second sides, a bale-forming chamber, a tailgate rotatable attached to the baler and movable between opposing open and closed positions, an actuator for selectively moving the tailgate, a latch pin disposed on the tailgate, and a latch mechanism for selectively securing the latch pin thereby securing the tailgate in the closed position, the improvement in the latching mechanism comprising:

an elongate lever arm having a first end and a generally opposing second end defining a longitudinal axis therebetween, said elongate lever arm having the first end pivotally connected to the first side, said first and second ends separated by a pivot axis, said lever arm pivotable about said pivot axis between latched and unlatched positions;

a catch plate connected to the second end of said lever arm by at least one fastener, said plate having a catch structure for engaging the latch pin when said lever arm is in said latched position and for allowing said latch pin to move when said tailgate moves when said lever arm is in said unlatched position; and at least one slot at said second end of said lever arm, said at least one slot for engagement by said at least one fastener to permit selective movement of said plate relative to said lever arm, said at least one slot is aligned to limit selective movement of said catch plate to movement along a single axis, said single axis is generally perpendicularly disposed with respect to said longitudinal axis, whereby said latch mechanism may be adjusted to accommodate variations in position of said latch pin on the tailgate within the plane of rotation of the tailgate.

2. The improvement of claim 1, wherein said at least one slot comprises a plurality of generally parallel slots.

3. The improvement of claim 2, further comprising a second latch mechanism disposed on the second side of the baler wherein said second latch mechanism features the improvement of the first latch mechanism.

* * * * *